United States Patent
Sakurai (10) Patent No.: US 6,742,159 B2
(45) Date of Patent: May 25, 2004

(54) ADDRESS PARITY ERROR PROCESSING METHOD, AND APPARATUS AND STORAGE FOR THE METHOD

(75) Inventor: Yasutomo Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 09/765,422

(22) Filed: Jan. 22, 2001

(65) Prior Publication Data

US 2001/0056567 A1 Dec. 27, 2001

(30) Foreign Application Priority Data

Jun. 22, 2000 (JP) ...................... 2000-187878

(51) Int. Cl.[7] .......................... G06F 11/00; G11C 29/00
(52) U.S. Cl. ........................ 714/801; 714/805
(58) Field of Search .................. 714/53, 718, 730, 714/738, 743, 763, 766, 768, 800, 801, 805, FOR 103; 365/200, 201

(56) References Cited

U.S. PATENT DOCUMENTS

| | | | | | |
|---|---|---|---|---|---|
| 5,392,302 A | * | 2/1995 | Kemp et al. | ................ | 714/805 |
| 5,537,425 A | * | 7/1996 | Tsou | .......................... | 714/805 |
| 5,663,969 A | * | 9/1997 | Tsou | .......................... | 714/805 |
| 5,917,839 A | * | 6/1999 | Hashimoto et al. | ......... | 714/805 |
| 6,374,381 B1 | * | 4/2002 | Moriya | ....................... | 714/746 |
| 6,408,417 B1 | * | 6/2002 | Moudgal et al. | ............ | 714/764 |
| 6,457,067 B1 | * | 9/2002 | Byers et al. | ................... | 710/3 |

FOREIGN PATENT DOCUMENTS

| | | | | |
|---|---|---|---|---|
| JP | 58-171798 | 10/1983 | ........... | G11C/29/00 |
| JP | 1-194035 | 8/1989 | ........... | G06F/11/10 |
| JP | 3-186954 | 8/1991 | ........... | G06F/12/16 |
| JP | HEI 7-105102 | 4/1995 | ........... | G06F/12/16 |

* cited by examiner

Primary Examiner—Albert Decady
Assistant Examiner—Matthew C. Dooley
(74) Attorney, Agent, or Firm—Staas & Halsey LLP (57) ABSTRACT

To improve the processing efficiency and throughput by performing only a recovery process in read-accessing to a memory even when an address parity error has occurred in write-accessing to the memory, a selector is provided to select one of write data and a parity-bitted address for writing to the memory. If an address parity error has detected, the selector selects the parity-bitted address, in which the address parity error has occurred, instead of write data to be written to the memory during the write-accessing thereto. This address parity error processing method is particularly useful when applied to an information processor, such as a computer system, including a storage (memory).

20 Claims, 9 Drawing Sheets

| S[3:0] | FAILURE LOCATION |
|---|---|
| 0000 | NO ERROR |
| 0001 | CO[0] |
| 0010 | CO[1] |
| 0011 |  |
| 0100 | CO[2] |
| 0101 | RD[7] |
| 0110 | RD[4] |
| 0111 | RD[1] |
| 1000 | CO[3] |
| 1001 | RD[6] |
| 1010 | RD[3] |
| 1011 | RD[0] |
| 1100 |  |
| 1101 | RD[5] |
| 1110 | RD[2] |
| 1111 | ADDRESS PARITY ERROR |

FIG. 9
RELATED ART

ADDRESS PARITY ERROR PROCESSING METHOD, AND APPARATUS AND STORAGE FOR THE METHOD

BACKGROUND OF THE INVENTION

1. Field of the Invention

The present invention relates to a method for processing an address parity error that has occurred in accessing a memory, and also to an apparatus and a storage which each have a function for realizing the method.

2. Description of the Related Art

Generally, in information processors, such as a computer system, which each include a storage (memory), an error check is performed using an address with a parity bit attached (hereinafter called an parity-bitted address) in accessing the memory. Also, the data is stored in the memory under the protection of the error checking and correction (ECC) function; if an error (1-bit error) is detected in the data read out from the memory, a process for correcting the detected error is performed.

Figure 9:
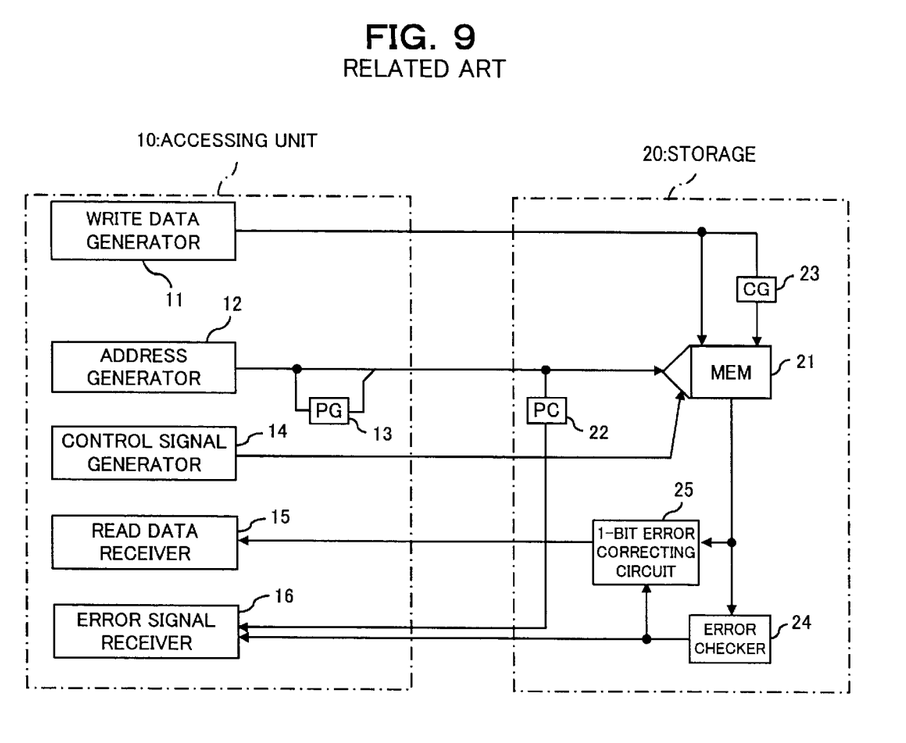
FIG. 9 is a block diagram showing an ordinary information processor.

An example of such an ordinary information processor will now be described with reference to FIG. 9. FIG. 9 is a block diagram showing the information processor equipped with an accessing unit 10 and a storage 20.

The accessing unit 10 comprises an write data generator 11, an address generator 12, a parity generator (PG) 13, a control signal generator 14, a read data receiver 15, and an error signal receiver 16, which are provided by a CPU, for example.

The storage 20 has a memory (MEM) 21 storing various types of data, a parity checker (PC) 22, a check bit generator (CG) 23, an error checker 24, and a 1-bit error correcting circuit 25.

The write data generator 11 generates the data to be written into the memory 21 in having access to the memory 21 to write (hereinafter interchangeably called "write-accessing" or "data writing process").

The address generator 12 generates an address of an access destination in accessing the memory 21.

The parity generator 13 generates a parity bit for the address generated by the address generator 12 and attaches the generated parity bit to the generated address.

The control signal generator 14 generates a control signal instructing the memory 21 to perform write-accessing or read-accessing.

The read data receiver 15 receives the data read out from the memory 21 in having access to the memory 21 to read (hereinafter interchangeably called "read-accessing" or "data reading process").

The error signal receiver 16 receives an error signal from the parity checker 22 and the error checker 24 (will be described later).

The parity checker 22 makes a parity check over the parity-bitted address from the accessing unit 10. If an address parity error is detected, the parity checker 22 notifies the accessing unit 10 (error signal receiver 16) of the error detection as an error signal.

The check bit generator 23 generates an error-correcting check bit corresponding to the data from the accessing unit 10 (write data generator 11) and writes to the memory 21 both the generated error-correcting check bit and the last-named data.

The error checker 24 produces and outputs a syndrome code (ECC code) based on both read data from the memory 21 and the error-correcting check bit for the read data in read-accessing to the memory 21. The syndrome code indicates whether or not an error appears in the read data and the type of the error, or which one of a 1-bit error and an uncorrectable error it is. If a single bit is in error (1-bit error), the syndrome code also includes the information as to which bit is in error (to be corrected). The syndrome code is sent to the 1-bit error correcting circuit 25 and the accessing unit 10 (error signal receiver 16) as an error signal. In this instance, the uncorrectable error is exemplified by a multi-bit error, in which two or more bits of the read data from the memory 21 are in error.

If a single bit is in error (1-bit error) in the read data, the 1-bit error correcting circuit 25 corrects the bit before sending the read data to the accessing unit 10 (read data receiver 15). At that time, if the error checker 24 detects a correctable error or a 1-bit error, the 1-bit error correcting circuit 25 specifies which bit to correct (an error bit) based on the syndrome code from the error checker 24, and corrects the read data by inverting the error bit. Contrarily, if no error is detected by the error checker 24, the read data passes through the 1-bit error correcting circuit 25 and is sent to the accessing unit 10 (read data receiver 15).

In the above information processor, the accessing unit 10 takes access to the memory 21 based on both the address generated by the address generator 12 and the control signal generated by the control signal generator 14.

Specifically, in write-accessing, the control signal generator 14 outputs to the memory 21 a control signal giving an instruction for writing-in. Then the write data, which is generated by the write data generator 11, and the check bit, which is generated by the check bit generating circuit 23 based on the last-named write data, are written to the memory 21 in the address, which is generated and designated by the address generator 12.

On the contrary, in read-accessing, the control signal generator 14 outputs to the memory 21 a control signal giving an instruction for reading-out. Then the data stored in the memory 21 in the address generated and designated by the address generator 12 is read out as the read data.

If the error checker 24 detects an error (1-bit error/uncorrectable error) in the read data, the error detection is notified to the accessing unit 10 (error signal receiver 16) as an error signal (syndrome code).

Upon occurrence of a 1-bit error, the 1-bit error correcting circuit 25 corrects the read data based on the syndrome code from the error checker 24, and the corrected read data is then sent to the accessing unit 10 (read data receiver 15). If no error is detected, the read data passes through the 1-bit error correcting circuit 25 and is then sent to the accessing unit 10 (read data receiver 15).

The parity bit generated by the parity generator 13 is attached to the address, which is generated by the address generator 12. The address is then transmitted to the storage 20, whereupon the parity checker 22 makes a parity check over the address using the parity bit.

If an address parity error occurs, it is unclear to which address in the memory 21 accessing should take place. Accordingly, upon detection of the address parity error by the parity checker 22, the error detection is notified to the accessing unit 10 (error signal receiver 16) as an error signal.

Upon receipt of the error signal from the parity checker 22 by its error signal receiver 16, the accessing unit 10 interrupts, during the process being currently made, to immediately perform a recovery process (error analysis or retry).

However, even if a recovery process is made immediately after the occurrence of the address parity error in write-accessing and then the write data is written into the memory 21, the write data becomes useless unless read accessing to the last-named write data is performed by the accessing unit 10, thus making the recovery process also useless.

Since a recovery process takes a relatively long time period, the processing efficiency and throughput of the accessing unit 10 would be reduced because such time-consuming recovery process is performed every when the address parity error occurs in write-accessing.

SUMMARY OF THE INVENTION

One object of the present invention is to provide an address parity error processing method in which the processing efficiency and throughput are improved by performing only a necessary recovery process that is required in read-accessing to a memory even when an address parity error has occurred in write-accessing to the memory.

Another object of the invention is to provide an apparatus for carrying out the above-mentioned method.

Still another object of the invention is to provide a storage for use in carrying out the above-mentioned method.

In order to attain the above second-named and third-named objects, there is provided an apparatus/storage comprising: a first selector for selecting one of write data and a parity-bitted address (an address with a parity bit attached) for writing to the memory. If an address parity error has been detected as the result of the parity check made by the parity checker in write-accessing to the memory, the first selector is operative to select the parity-bitted address, in which the address parity error has occurred, for writing the selected address, instead of writing the write data, to the memory during the write-accessing.

In order to attain the above first-named object, in the apparatus/storage, a parity check is made over the parity-bitted address generated in write-accessing to a memory. If an address parity error has been detected as the result of the parity check, the parity-bitted address, in which the address parity error has occurred, is written to the memory, thus realizing the address parity error processing method according to the present invention.

As one preferred feature, upon occurrence of an address parity error, only the address in place of the write data, which would not be used until being read out, is written to the memory. After that, if the parity-bitted address, in which the address parity error has occurred, is read out from the memory in read-accessing, a recovery process is performed for the address parity error. In this manner, only a required recovery process can be performed in read-accessing to a memory, even when an address parity error has occurred in write-accessing to the memory, thus making it possible to save unnecessary recovery processing if data about the address parity error is not used.

As another preferred feature, an error checker is provided to detect the address parity error based on an error-correcting check bit for the data to be read out, making it possible to recognize in the read-accessing that the parity-bitted address, in which the address parity error has occurred, is read out.

The detection of an address parity error by the error checker is realized by the following exemplified construction:

(1) changing means changes an error-correcting check bit, which is to be written to the memory along with an address.

If the address is then read back in read-accessing, the error checker produces a syndrome code indicating an uncorrectable error. With this construction, when the address, in which the address parity error has occurred, is read out from the memory, the error checker can detect the uncorrectable error. At that time, the changing means can be easily realized in the form of a circuit for inverting the bit data of the error-correcting check bit to be written to the memory.

(2) upon occurrence of an address parity error, an error-correcting check bit, which allows the error checker to produce a syndrome code that can specify the address parity error, is written to the memory. With this construction, upon read-out of the address in which the address parity error has occurred, the error checker can immediately recognize that the read data is related with the address parity error.

As still another preferred feature, the apparatus further comprises a judging section for discriminating, upon detection of an address parity error in accessing to the memory, whether or not the address parity error is due to a parity bit. If, using the judging section, an address parity error due to any other reason than a parity bit is detected in write-accessing to the memory, the parity-bitted address, in which the address parity error has occurred, is written to the memory. In the meantime, if an address parity error due to a parity bit is detected, the write data is written to the memory as it is.

With this construction, if only a parity bit is in error but with no error in address data, the write data is written to the memory as normal. On the contrary, if an error has occurred in the address data, the address, in which the address parity error has occurred, is written therein.

As a further preferred feature, if an address parity error is detected in read-accessing to the memory, the parity-bitted address, in which the address parity error has occurred, is output, instead of the read data to be read out from the memory, during the read-accessing thereto, thus enabling an immediate error analysis based on the address.

At that time, if, using the judging section, an address parity error due to any other reason than a parity bit is detected in read-accessing to the memory, the parity-bitted address, in which the address parity error has occurred, is output as the read data. In the meantime, if an address parity error due to a parity bit is detected, the read data is read out to be output as it is.

With this construction, if only a parity bit is in error but with no error in address data, the read data is read out from the memory as normal. On the contrary, if an error has occurred in the address data, the address, in which the address parity error has occurred, is output as the read data.

In this instance, two or more parity bits are generated and attached to an address, thus causing a parity bit multiplication. Based on whether or not the plural parity bits are identical, the judging section is able to discriminate whether or not the address parity error is due to the parity bits.

According to the address parity error processing method, the apparatus, and the storage of the present invention, it is possible to guarantee the following advantageous results:

(1) Only a necessary recovery process required in read-accessing to a memory is performed even when an address parity error has occurred in write-accessing to the memory. Namely, since no recovery process such as an error analysis or retry is made for the address parity error unless the data about the address parity error is used, unnecessary recovery processes can be saved, thus greatly improving the processing efficiency and throughput in the apparatus, such as a computer system. Further, the address written to the memory (the parity-bitted address in which the address parity error has occurred) facilitates the error analysis.

(2) It is possible to realize with ease the above-mentioned functions and results by simply adding to an existing apparatus or storage a selector as hardware.

(3) In read-accessing to the memory, it is possible to recognize, using an error-correcting check bit, that the parity-bitted address, in which the address parity error has occurred, is read out from the memory and then to immediately moves the procedure to a recovery process for the address parity error.

(4) At that time, changing means damages the error-correcting check bit to generate a syndrome code indicating an uncorrectable error, thus making it possible to recognize the read-out of the address, in which the address parity error has occurred, as the occurrence of the uncorrectable error.

(5) And, the error-correcting check bit is used to generate a syndrome code which specifies the address parity error, thus making it possible to immediately recognize that the read data from the memory is related with the address parity error. In this case, the generating the syndrome code based on the check bit can be realized with ease by utilizing an existing error checking and correction (ECC) function with changes in software only added.

(6) Only when an error appears in address data, the address, in which the address parity error has occurred, is written to the memory. Therefore, with no address data bit in error, a write process is performed as normal to save unnecessary recovery processing, thus further improving the processing efficiency and throughput.

(7) If an address parity error is detected in read-accessing to the memory, the parity-bitted address, in which the address parity error has occurred, is output instead of the read data. Accordingly an error analysis can be immediately performed based on the address and a recovery process such as retry can also be made without delay, thus improving the processing efficiency.

(8) Only when an error appears in address data, the address, in which the address parity error has occurred, is output as the read data. Therefore, with no address data bit in error, a read process is performed as normal to save unnecessary recovery processing, thus further improving the processing efficiency and throughput.

Other objects and further features of the present invention will be apparent from the following detailed description when read in conjunction with the accompanying drawings.

DESCRIPTION OF THE PREFERRED EMBODIMENT(S)

Embodiments of the present invention will now be described with reference to the accompanying drawings.

Figure 8A:
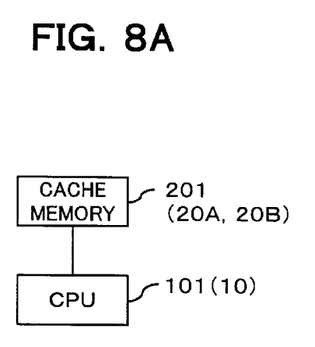
FIG. 8A and FIG. 8B are block diagrams each showing an example of system construction to which the present invention is applied.
Figure 8B:
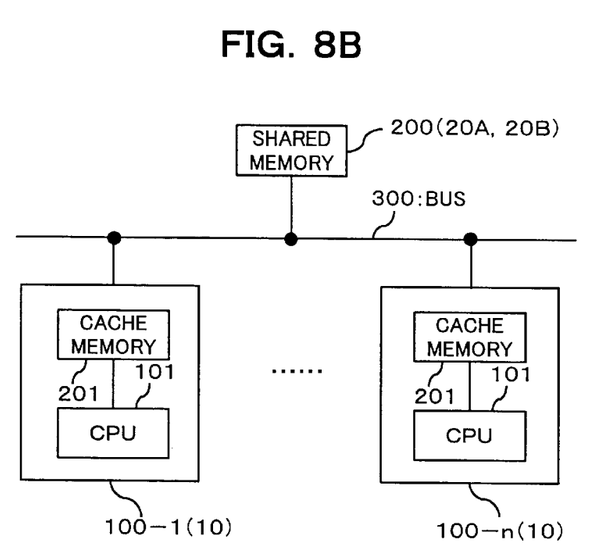

FIG. 8A and FIG. 8B each show an example of system (information processor) to which the present invention is applied. In the system of FIG. 8A, a CPU 101 takes access to a cache memory 201. In the system of FIG. 8B, two or more CPU modules 100-1 through 100-n are connected to a shared memory 200 via a bus 300 for having access thereto. The CPU modules 100-1 through 100-n each are similar in construction to those of the system of FIG. 8A.

The present invention is applicable to either system of FIG. 8A or FIG. 8B. In other words, the CPU 101 and the CPU modules 100-1 through 100-n correspond to an accessing unit 10 according to the later-described embodiments. Likewise, the cache memory 201 and the shared memory 200 correspond to a storage 20A or a storage 20B according to the later-described embodiments.

(1) First Embodiment

Figure 1:
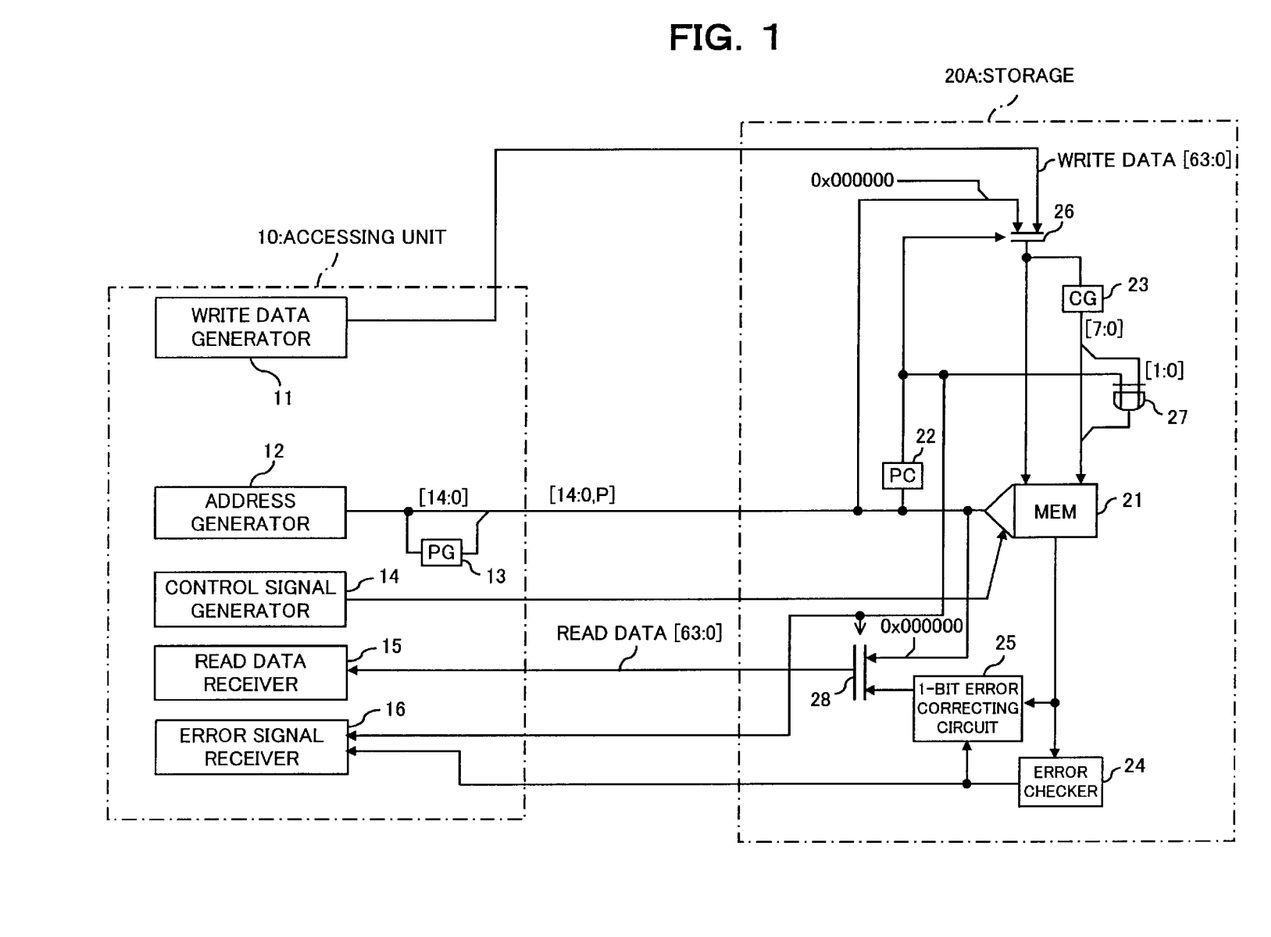
FIG. 1 is a block diagram showing an information processor according to a first embodiment of the present invention.

FIG. 1 shows an information processor (apparatus) according to a first embodiment of the present invention. The information processor of FIG. 1 is equipped with an accessing unit 10 and a storage 20A.

The accessing unit (CPU, CPU module) 10, like that of the ordinary information processor of FIG. 9, includes a write data generator 11, an address generator 12, a parity generator (PG) 13, a control signal generator 14, a read data receiver 15, and an error signal receiver 16. Like reference numbers designate similar parts or elements throughout several views of the present embodiment and the related art, so their detailed description is omitted here.

In the accessing unit 10 of the first embodiment, the write data generator 11 generates 64-bit write data [63:0]; the address generator 12, 15-bit address data [14:0]; and the parity generator 13, 1-bit parity P. The parity P is attached to the 15-bit address data [14:0] to obtain 16-bit data [14:0,P], which is then sent from the accessing unit 10 to the storage 20A as an address.

The storage 20A of the present embodiment like that of the related art of FIG. 9, comprises a memory (MEM) 21, a parity checker (PC) 22, a check bit generator (CG) 23, a error checker 24, and a 1-bit error correcting circuit 25. The storage 20A further includes a first selector 26, an XOR gate 27, and a second selector 28.

The parity checker 22 makes a parity check over a parity-bitted address (address with a parity bit attached) [14:0,P] received from the accessing unit 10. If an address parity error is detected, the parity checker 22 notifies the accessing unit 10 (error signal receiver 16) of the error detection by an error signal.

The check bit generator 23 generates error-correcting check bits [7:0] corresponding to the data [63:0] to be written to the memory 21, and then writes the check bits [7:0] to the memory 21 along with the last-named data [63:0]. In this instance, if the data to be written in the memory 21 is 64 bits, the check bits generated by the check bit generator 23 are 8 bits.

The error checker 24 and the 1-bit correcting circuit 25 are similar to those of the related art of FIG. 9, so their detailed description is omitted here.

The first selector 26 selects one of the write data [63:0] and the parity-bitted address [14:0,P] to write to the memory 21. If an address parity error is detected as the result of a parity check made by the parity checker 22 in write-accessing to the memory 21, the first selector 26 selects the parity-bitted address [14:0,P], in which the address parity error has occurred, to write to the memory 21, instead of the write data [63:0] to be written in the write-accessing. In the present embodiment, upon writing the parity-bitted address [14:0,P] instead of the write data [63:0], the address [14:0,P] is written for write data [15:0]; and 0x000000, for write data [63:16].

When the parity-bitted address [14:0,P], in which the address parity error has occurred, is written to the memory 21, the XOR gate 27 functions as changing means for changing the error-correcting check bits [7:0] generated by the check bit generator 23, in such a manner that a syndrome code (ECC code) indicating an uncorrectable error is produced by the error checker 24 upon reading back the address [14:0,P] as the read data from the memory 21.

Specifically, the XOR gate 27 computes the exclusive OR of the check result from the parity checker 22 and each of 2 bits [1:0] out of the error-correcting check bits [7:0] from the check bit generator 23. The computed result is written to the memory 21 in place of the these 2 bits [1:0]. Upon detection of a parity error, the check result from the parity checker 22 becomes "1", or else, it becomes "0".

In this manner, the XOR gate 27 operates as a circuit to invert the values of the 2 bits [1:0] of the error-correcting check bits [7:0] upon detection of a parity error. This inverting process causes the error-correcting check bits [7:0] to assure a broken state. Thus, if the parity-bitted address [14:0,P], in which the address parity error has occurred, is read out from the memory 21 as the read data, the error checker 24 produces a syndrome code (ECC code) indicating an uncorrectable error because of the broken error-correcting check bits [7:0], so that the address parity error is detected as the occurrence of an uncorrectable error.

The second selector 28 selects one of the read data [63:0] and the parity-bitted address [14:0,P] for outputting to the accessing unit 10 (read data receiver 15). If an address parity error is detected as the result of a parity check by the parity checker 22 in read-accessing to the memory 21, the second selector 28 selects and outputs the parity-bitted address [14:0,P], in which the address parity error has occurred, instead of the read data [63:0] to be read out in the read-accessing. In the present embodiment, upon outputting the parity-bitted address [14:0,P] instead of the read data [63:0], the address [14:0,P] is output as substitution for the read data [15:0], and 0x000000 is output as substitution for the read data [63:16].

Figure 2:
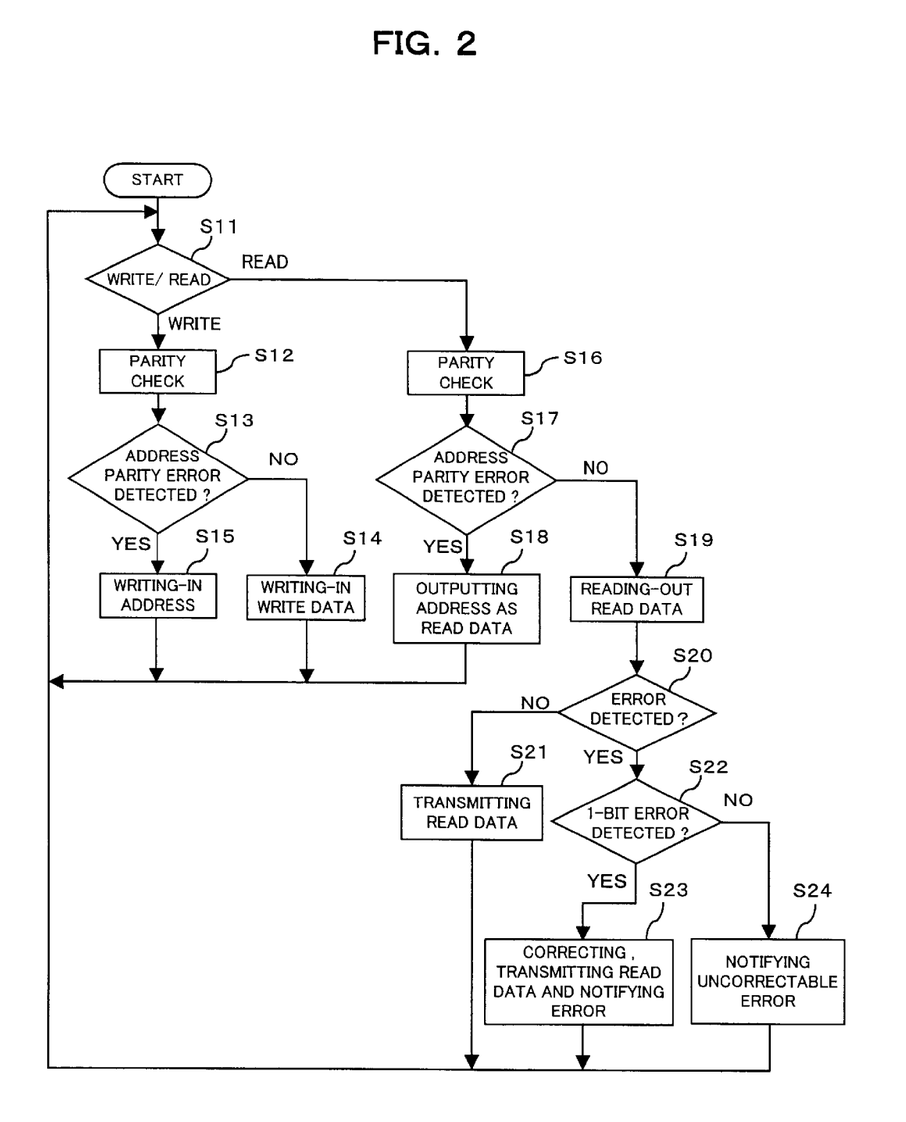
FIG. 2 is a flowchart illustrating the operation of a storage of the first embodiment.

The operation of the storage 20A of the information processor of the first embodiment will now be described with reference to the flowchart of FIG. 2 (steps S11 through S24).

In the storage 20A of the first embodiment, if write-accessing is performed to the memory 21 by the accessing unit 10 (WRITE route of step S11), an address parity check is made by the parity checker 22 (step S12).

As the result of the parity check, if no address parity error has occurred (NO route of step S13), the write data [63:0] generated by the write data generator 11 is selected by the first selector 26 and written to the memory 21 (step S14) as normal. At that time, check bits [7:0] are generated from the write data [63:0] by the check bit generator 23 and then written to the memory 21 along with the write data [63:0].

As the result of the check made by the parity checker 22, if an address parity error is detected (YES route of step S13), the parity-bitted address [14:0,P] is selected by the first selector 26 and written to the memory 21 (step S15). At that time, the address [14:0,P], instead of the write data [15:0], is written to the memory 21, and 0x000000, instead of the write data [63:16], is written. Also, check bits [7:0] are generated from the parity-bitted address [14:0,P] by the check bit generator 23, and at this time, the values of 2 bits [1:0] out of the check bit [7:0] are inverted by the XOR gate 27, and the broken check bits [7:0] are then written to the memory 21 along with the address [14:0,P].

Likewise, in the storage 20A, if read-accessing is performed to the memory 21 by the accessing unit 10 (READ route of step S11), an address parity check is made by the parity checker 22 (step S16).

As the result of the parity check, if an address parity error is detected (YES route of step S17), the parity-bitted address [14:0,P] is selected by the second selector 28 to output or transmit to the read data receiver 15 of the accessing unit 10 (step S18). At that time, as described above, the address [14:0,P], instead of the read data [15:0], is output, and 0x000000, instead of the read data [63:16], is output.

In this manner, if an address parity error occurs in read-accessing to the memory 21, the accessing unit 10 is notified of the occurrence of the error by the parity checker 22, and at the same time, the parity-bitted address, in which the address parity error has occurred, is transmitted thereto as the read data [63:0]. Accordingly, the accessing unit 10 can specify which bit is in failure in an extremely simple way, by comparing the address sent by the address generator 12 with the address in which the address parity error has occurred upon the memory-reading.

As the result of the check made by the parity checker 22, if no address parity error has occurred (NO route of step S17), the data [63:0] is read out from the memory 21 (step S19). At that time, the second selector 28 becomes operative to select the read data from the memory 21. A syndrome code (ECC code) is produced by the error checker 24 based on the check bits [7:0], which are read out from the memory 21 along with the read data [63:0], and an error check is made for the read data [63:0].

If no error is detected by the error checker 24 (NO route of step S20), the read data [63:0] passes through the 1-bit error correcting circuit 25 and the second selector 28 and is sent to the read data receiver 15 of the accessing unit 10 (step S21).

If a 1-bit error is detected by the error checker 24 (YES route of step S20 and YES route of step S22), the error bit of the read data [63:0] is specified and corrected by the 1-bit error correcting circuit 25 based on the syndrome code from the error checker 24. The corrected read data [63:0] is then sent to the read data receiver 15 of the accessing unit 10 while an error notification (an error signal transmission) is made (step S23) by the error checker 24 to the error signal receiver 16 of the accessing unit 10.

If an uncorrectable error is detected by the error checker 24 (NO route of step S22), the error detection is notified or sent (step S24) from the error checker 24 to the error signal receiver 16 of the accessing unit 10 by an error signal (syndrome code). Specifically, in the first embodiment, the uncorrectable error is detected when the above-described multi-bit error has occurred, or when the address [14:0,P] in which the address parity error has occurred in write-accessing to the memory 21, is read out therefrom.

As described above, if the address [14:0,P], in which the address parity error has occurred, is read out from the memory 21, a part of the check bits for the address [14:0,P] have been inversed. An uncorrectable error is thus surely detected by the error checker 24; upon notification of the error detection, the accessing unit 10 starts a recovery process.

Alternatively, upon notification of the uncorrectable error to the accessing unit 10, the read out data itself may be sent from the second selector 28 to the read data receiver 15 of the accessing unit 10. In this case, the address [14:0,P], in which the address parity error has occurred, is received by the accessing unit 10 along with the notification of the uncorrectable error, facilitating an error analysis, which is performed by the accessing unit 10, based on the address [14:0,P].

Even if the address [14:0,P], in which the address parity error has occurred, is written to the memory 21, the error itself would be removed if the entry where the address is written is normally overwritten by new write data, or if the entry is made invalid (only when the memory 21 is a cache memory). Accordingly, even if no notification of the address parity error is made to the accessing unit 10 in write-accessing, the error is expected to be removed by itself. If the address is read back from the memory 21, however, the accessing unit 10 must recognize such reading in the present embodiment; this is the reason why the notification of an uncorrectable error is made to the accessing unit 10.

In this manner, according to the information processor or the storage 20A of the first embodiment, only a required recovery process is made in read-accessing even if an address parity error has occurred in write-accessing. That is, unless the data related with the address parity error is used, no recovery process such as error analysis or retry would be made to save unnecessary recovery processing, thus greatly improving the processing efficiency and throughput of the information processor, such as a computer system. At that time, in the accessing unit 10, the error analysis can be made with ease using the address (parity-bitted address in which the address parity error has occurred) having been written to the memory 21.

Also, in read-accessing to the memory 21, the read-out of the parity-bitted address, in which the address parity error has occurred, is recognized by using the error-correcting check bit, so that the accessing unit 10 can immediately start a recovery process for the address parity error.

At that time, in the first embodiment, the error-correcting check bit is broken using the XOR gate 27 so that a syndrome code indicating an uncorrectable error is produced in the error checker 24, thus making it possible to recognize that the address, in which the address parity error has occurred, is read out from the memory 21, as the occurrence of the uncorrectable error.

Meanwhile, if an address parity error is detected in read-accessing, the parity-bitted address, in which the address parity error has occurred, instead of the read data, is transmitted to the accessing unit 10. In the accessing unit 10, an error analysis can be immediately made based on the address, so that a recovery process, such as retry can also be made without delay, consequently improving the processing efficiency.

Figure 3:
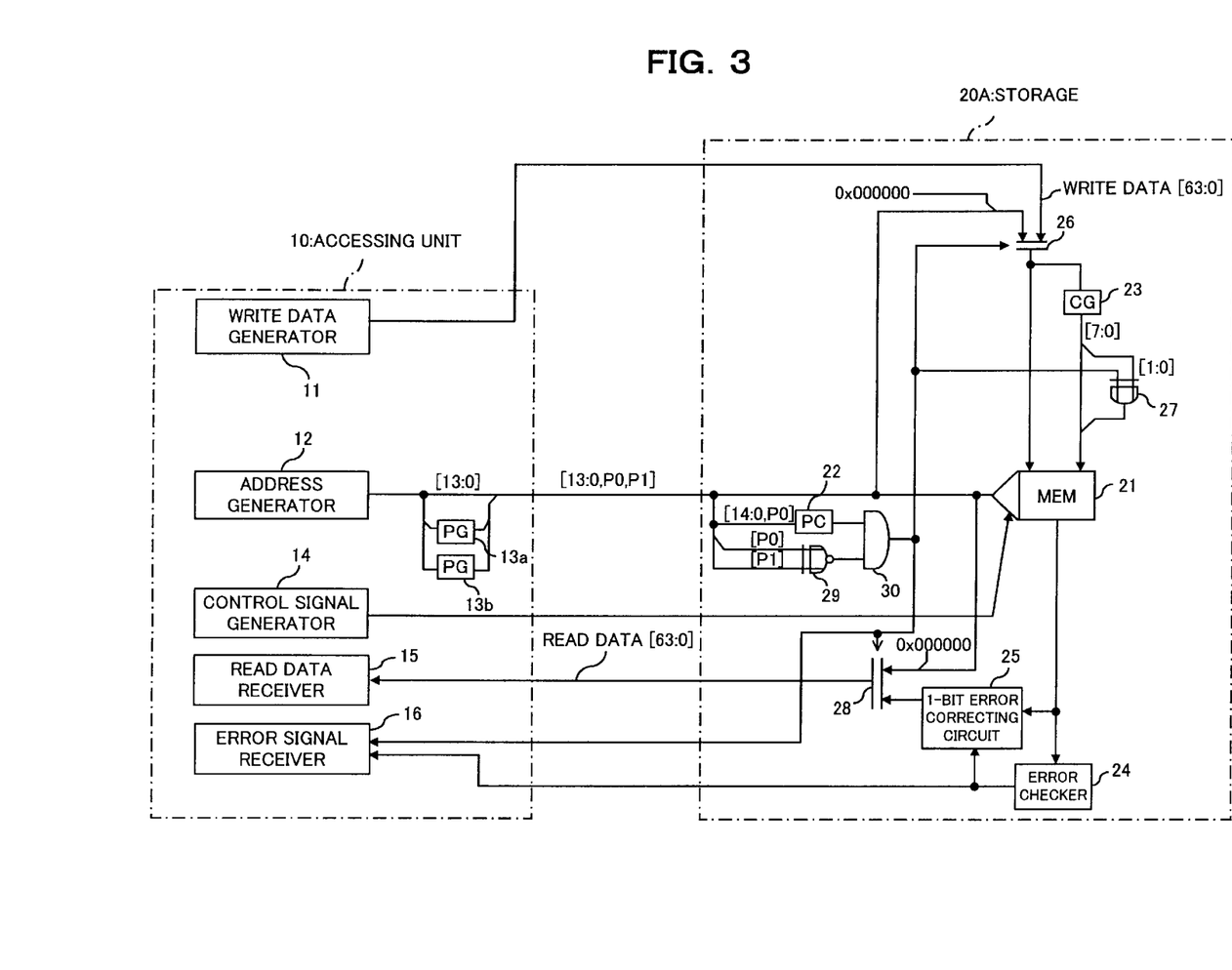
FIG. 3 is a block diagram showing a modified form of the information processor of the first embodiment.

FIG. 3 shows a modified form of the information processor (apparatus) of the first embodiment. In contrast to the accessing unit 10 of FIG. 1, which is equipped with the only one parity generator 13, the accessing unit 10 of FIG. 3 has a pair of parity generators 13a and 13b. Further, in the storage 20A of FIG. 3, an XNOR gate 29 and an AND gate 30 are newly added. Like reference numbers designate similar parts or elements throughout several views, so their description is omitted here.

The two parity generators 13a and 13b each generate a parity bit P0, P1 for the address generated by the address generator 12 and attach the generated parity bit to the last-named address. That is, in this modification, the two parity bit generators 13a and 13b provide multiplied (double) parity bits.

In the accessing unit 10 of this modification, the address generator 12 generates 14-bit address data [13:0], to which two parity bits P0, P1 are attached to obtain 16-bit data [13:0,P,P0], which is then sent from the accessing unit 10 to the storage 20A as an address. In the storage 20A of FIG. 3, 15 bits out of the 16-bit address from the accessing unit 10, excluding the parity bit P1, is input to the parity checker 22.

In the storage 20A of FIG. 3, if an address parity error is detected by the parity checker 22 in read-accessing to the memory 21, the XNOR gate 29 and the AND gate 30 operate as a judging section to discriminate whether or not the address parity error is caused by a parity bit.

Specifically, based on whether or not the plural (two) parity bits are identical, the XNOR gate 29 and the AND gate 30 discriminate whether or not the address parity error is due to a parity bit. The XNOR gate 29 compares the two parity bits P0 and P1 from the accessing unit 10, and then, if these parity values are found identical, "1" is output; if unidentical, "0" is output. The AND gate 30 ANDs the output of the XNOR gate 29 and that of the parity checker 22 ("1", upon detection of a parity error) and then outputs the AND result to the selectors 26, 28 and the XOR gate 27.

Consequently, if the values of the parity bits P0, P1 are identical, it is recognized that the address parity error detected by the parity checker 22 is due to the address data itself but not to the parity bit. On the contrary, if the parity bits P0, P1 are unidentical, it is recognized that the address parity error is due to the parity bit and the address data itself has no error.

In the present modified example, if the values of the parity bits P0, P1 are identical, "1" is output from the XNOR gate 29 so that the check result (output) of the parity checker 22 can pass through the AND gate 30 and becomes valid. Contrarily, if unidentical, "0" is output so that the check result cannot pass through the AND gate 30 and becomes invalid.

With this construction, in the information processor (storage 20A) of FIG. 3, if an address parity error is detected by the parity checker 22 in write-accessing to the memory 21 and if the address parity error is not due to a parity bit (the values of the parity bits P0, P1 are identical), "1" is output from the AND gate 30, whereupon the first selector 26 selects the parity-bitted address, in which the address parity error has occurred, for writing to the memory 21 and also the XOR gate 27 executes an inversing process.

Likewise, if an address parity error is detected by the parity checker 22 in read-accessing to the memory 21 and if the address parity error is not due to a parity bit (the values of parity bits P0, P1 are identical), "1" is output from the AND gate 30, where upon the second selector 28 selects and outputs the parity-bitted address, in which the address parity error has occurred.

On the other hand, if an address parity error is detected by the parity checker 22 in write-accessing to the memory 21 and if the address parity error is due to a parity bit (the values of the parity bits P0, P1 are unidentical), "0" is output from the AND gate 30, whereupon the first selector 26 selects the write data as normal for writing in the memory 21, and no inversing process is executed by the XOR gate 27.

Likewise, if an address parity error is detected by the parity checker 22 in read-accessing to the memory 21 and if the address parity error is due to a parity bit (the values of parity bits P0, P1 are unidentical), "0" is output from the AND gate 30, whereupon the second selector 28 selects as normal the read data for reading out from the memory 21 and outputting as it is to the accessing unit 10.

The information processor (storage 20A) of FIG. 3 provides the same results as those obtained in the above-described first embodiment. Further, only when an error has occurred in the address data, the address, in which the address parity error has occurred, is written to the memory 21. Therefore, with no error contained in the address data, a normal write process is performed to save unnecessary recovery processing, thus further improving the processing efficiency and throughput.

Likewise, only when an error has occurred in the address data, the address, in which the address parity error has occurred, is output as the read data to the accessing unit 10. Therefore, with no error contained in the address data, a normal read process is performed to save unnecessary recovery processing, thus further improving the processing efficiency and throughput.

(2) Second Embodiment

Figure 4:
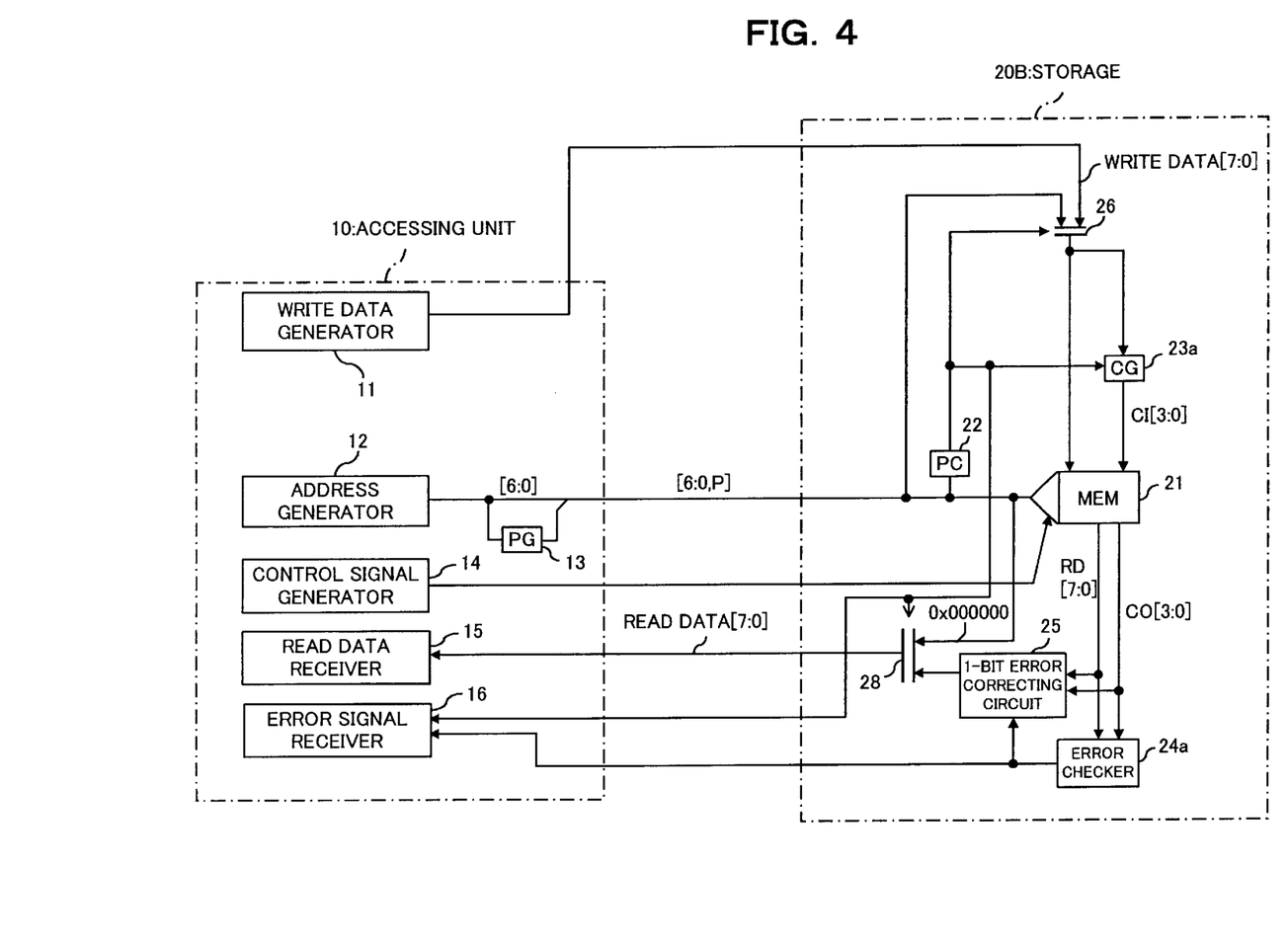
FIG. 4 is a block diagram showing an information processor according to a second embodiment of the present invention.
Figure 5:
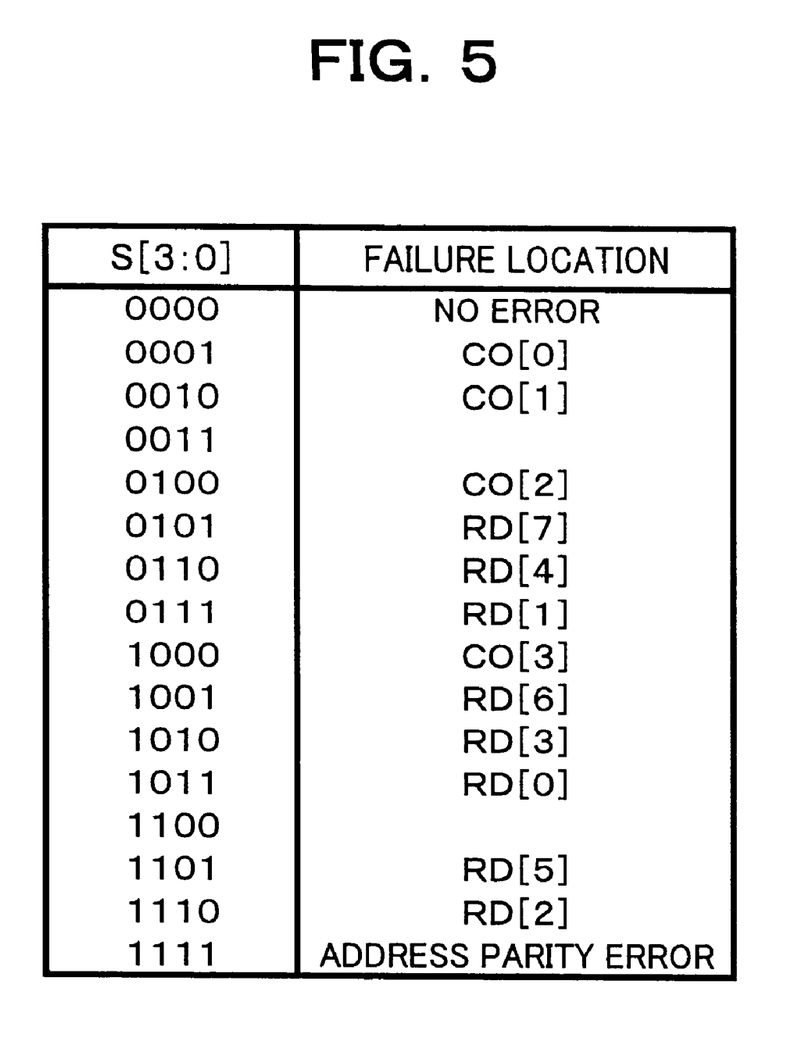
FIG. 5 is a table showing syndrome codes (ECC codes) in the second embodiment.

FIG. 4 shows an information processor (apparatus) according to a second embodiment of the present invention. FIG. 5 shows syndrome codes (ECC codes) in the second embodiment.

The information processor of FIG. 4 is equipped with an accessing unit 10 and a storage 20B.

The accessing unit (CPU, CPU module) 10 includes, like that of the first embodiment shown in FIG. 1 (and that of the related art shown in FIG. 9), a write data generator 11, an address generator 12, a parity generator (PG) 13, a control signal generator 14, a read data receiver 15, and an error signal receiver 16. Like reference numbers designate similar parts or elements throughout several views in connection with different embodiment and related art, so their detailed description is omitted here.

In the accessing unit 10 of the second embodiment, the write data generator 11 generates 8-bit write data [7:0]; the address generator 12, 7-bit address data [6:0]; and the parity generator 13, 1-bit parity P. The parity P is attached to the 7-bit address data to obtain 8-bit data [6:0,P], which is then sent from the accessing unit 10 to the storage 20B as an address.

The storage 20B of the second embodiment comprises, like the storage 20A of FIG. 1, a memory (MEM) 21, a parity checker (PC) 22, a 1-bit error correcting circuit 25, a first selector 26, and a second selector 28. The storage 20B further includes a check bit generator (CG) 23a and an error checker 24a.

The parity checker 22 makes a parity check over a parity-bitted address (address with a parity bit attached) [6:0, P] received from the accessing unit 10. If an address parity error is detected, the parity checker 22 notifies the accessing unit 10 (error signal receiver 16) of the error detection by an error signal.

The first selector 26 selects one of the write data [7:0] and the parity-bitted address [6:0,P] for writing to the memory 21. If an address parity error is detected as the result of a parity check made by the parity checker 22 in write-accessing to the memory 21, the first selector 26 selects the parity-bitted address [6:0,P], in which the address parity error has occurred, instead of the write data [7:0] to be written in the write-accessing, for writing to the memory 21.

The second selector 28 selects one of the read data [7:0] and the parity-bitted address [6:0,P] for outputting to the accessing unit 10 (read data receiver 15). If an address parity error is detected as the result of a parity check made by the parity checker 22 in read-accessing to the memory 21, the second selector 28 selects and outputs the parity-bitted address [6:0,P], in which the address parity error has occurred, instead of the read data [7:0] to be read out in the read-accessing.

The 1-bit correcting circuit 25 is similar to that of the related art shown in FIG. 9, so their description is omitted here.

The check bit generator 23a generates error-correcting check bits CI [3:0] corresponding to the data [7:0] or to the address [6:0,P] to be written to the memory 21, and then writes the generated check bits CI [3:0] to the memory 21 along with the last-named data [7:0]. In this instance, if the data to be written is 8 bits, check bits generated by the check bit generator 23a are 4 bits.

In the second embodiment, the check bit generator 23a generates, during the writing of the parity-bitted address [6:0,P], in which the address parity error has occurred, the error-correcting checkbits (CI) [3:0] in such a manner that a-syndrome code (ECC code; in FIG. 5), which can specify the address parity error, is produced by the error checker 24a upon read-out of the address as the read data from the memory 21.

The error checker 24a, in read-accessing to the memory 21, produces a syndrome code S [3:0] from the read data [7:0] or the address [6:0,P] and from error-correcting check bits CO [3:0] for the read data [7:0].

The syndrome code S [3:0] produced by the error checker 24a in this embodiment is shown in FIG. 5, for example. The table of FIG. 5 shows the actual error location (failure location) on the read data for each syndrome code S [3:0] produced by the error checker 24a.

As shown in FIG. 5, the syndrome code S [3:0] of "0b0000" in read-accessing indicates that no bit is in error; for example the syndrome code S of "0b1011" indicates that the read data [0] (RD[0]) is in error. In a common syndrome code system, 13 types of error states (RD [7:0], CO [3:0]) in total including one error-less state are assigned one to each syndrome code. In a 4-bit syndrome code system, however, since 16 types of error states at maximum can be assigned to possible 16 codes, it is possible to assign additional three types of error states.

Thus, in the second embodiment, the code of "0b1111", which has ever been an empty code, is assigned to designate an address parity error. The check bit generator 23 a generates check bits CI [3:0] in such a manner that the syndrome code S [3:0] becomes "0b1111" if an address parity error occurs in write-accessing, and writes the generated check bits CI [3:0] to the memory 21.

Upon read-out of the check bits and the data from the memory 21, the error checker 24a generates the syndrome code indicating an address parity error and sends the generated syndrome code to the accessing unit 10 as an error signal, notifying the accessing unit 10 of the address parity error.

Figure 6:
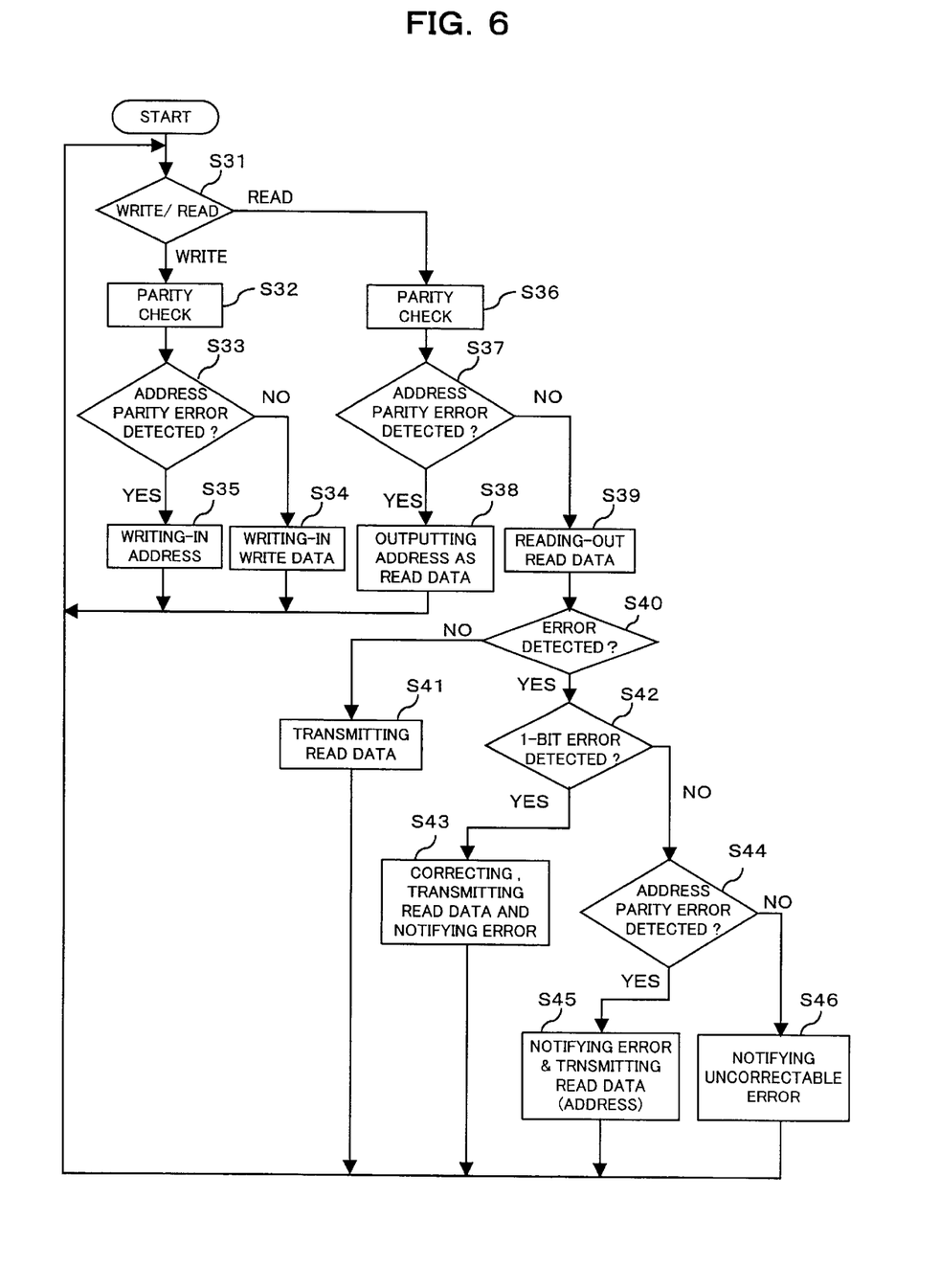
FIG. 6 is a flowchart illustrating the operation of a storage of the second embodiment.

The operation of the storage 20B of the information processor of the second embodiment will now be described with reference to the flowchart of FIG. 6 (steps S31 through S46).

In the storage 20B of the second embodiment, if write-accessing to the memory 21 is performed by the accessing unit 10 (WRITE route of step S31) an address parity check is made by the parity checker 22 (step S32).

As the result of the parity check, if no address parity error has occurred (NO route of step S33), the write data [7:0] generated by the write data generator 11 is selected by the first selector 26 for writing to the memory 21 (step S34) as normal. At that time, checkbits CI [3:0] are generated from the write data [7:0] by the check bit generator 23a and then written to the memory 21 along with the last-named write data [7:0].

As the result of the check made by the parity checker 22, if an address parity error is detected (YES route of step S33), a parity-bitted address (address with a parity bit attached) [6:0,P] is selected by the first selector 26 for writing to the memory 21 (step S35). At that time, as described above, the check bits CI [3:0] are generated by the check bit generator 23a in such a manner that the syndrome code S [3:0] becomes "0b1111", and then written to the memory 21 along with the address [6:0,P].

In the storage 20B, if read-accessing to the memory 21 is performed by the accessing unit 10 (READ route of step S31), an address parity check is made by the parity checker 22 (step S36).

As the result of the check, if an address parity error is detected (YES route of step S37), a parity-bitted address [6:0,P] is selected by the second selector 28 for outputting or transmitting to the read data receiver 15 of the accessing unit 10 (step S38).

In this manner, if an address parity error occurs in read-accessing to the memory 21, the error is notified to the accessing unit 10 by the parity checker 22, and at the same time, the parity-bitted address [6:0,P], in which the address parity error has occurred, is transmitted thereto as the read data [7:0]. Accordingly, like in the first embodiment, the accessing unit 10 can specify which bit is in error in an extremely simple way, by comparing the address output from the address generator 12 with the address in which the address parity error is detected during the memory reading.

As the result of the check made by the parity checker 22, if no address parity error has occurred (NO route of step S37), the data [7:0] is read out from the memory 21 (step S39). At that time, the second selector 28 becomes operative to select the read data from the memory 21. A syndrome code S [3:0] is produced by the error checker 24a based on the check bits CO [3:0], which is read out from the memory 21 along with the read data [7:0], and an error check is made for the read data [7:0].

If no error is detected by the error checker 24a (NO route of step S40), the read data [7:0] passes through the 1-bit error correcting circuit 25 and the second selector 28 and is then sent to the read data receiver 15 of the accessing unit 10 (step S41).

If a 1-bit error is detected by the error checker 24a (YES route of step S40 and YES route of step S42), the 1-bit error correcting circuit 25 specifies, based on the syndrome code S [3:0] from the error checker 24a, which bit of the read data [7:0] is in error, and the error correcting circuit 25 corrects the error. The corrected read data [7:0] is then sent to the read data receiver 15 of the accessing unit 10 while an error notification (error signal transmission) is made to the error signal receiver 16 of the accessing unit 10 by the error checker 24a (step S43).

If an address parity error is detected by the error checker 24a, namely, if the syndrome code S [3:0] is "0b1111" (NO route of step S42 and YES route of step S44), an error signal (syndrome code) is sent from the error checker 24a to the error signal receiver 16 of the accessing unit 10 to notify the accessing unit 10 of the error detection (step S45).

As described above, if the address [6:0,P], in which the address parity error has occurred, is read out from the memory 21, a specific syndrome code is generated in the error checker 24a of the second embodiment and sent to the accessing unit 10, so that the accessing unit 10 can start the recovery process corresponding to the address parity error.

When the specific syndrome code is sent to the accessing unit 10 as an error signal, the address [6:0,P] read out from the memory 21 can be sent, as it is, from the second selector 28 to the read data receiver 15 of the accessing unit 10, thus facilitating an error analysis, which is performed by the accessing unit 10, based on the address [6:0,P].

If an uncorrectable error is detected by the error checker 24a (NO route of step S44), an error signal (syndrome code) is sent from the error checker 24a to the error signal receiver 16 of the accessing unit 10 to notify the accessing unit 10 of the error detection (step S46).

In this manner, the information processor (storage 20B) of the second embodiment provides the same results as those obtained in the above-described first embodiment. Further, the syndrome code, which can specify the address parity error, is generated using the error-correcting check bits, thus enabling immediate recognition that the read data from the memory 21 is related with the address parity error. At that time, the generating the syndrome code, which can specify the address parity error, is significantly easily realized by utilizing an existing ECC function with some changes added only in software.

Figure 7:
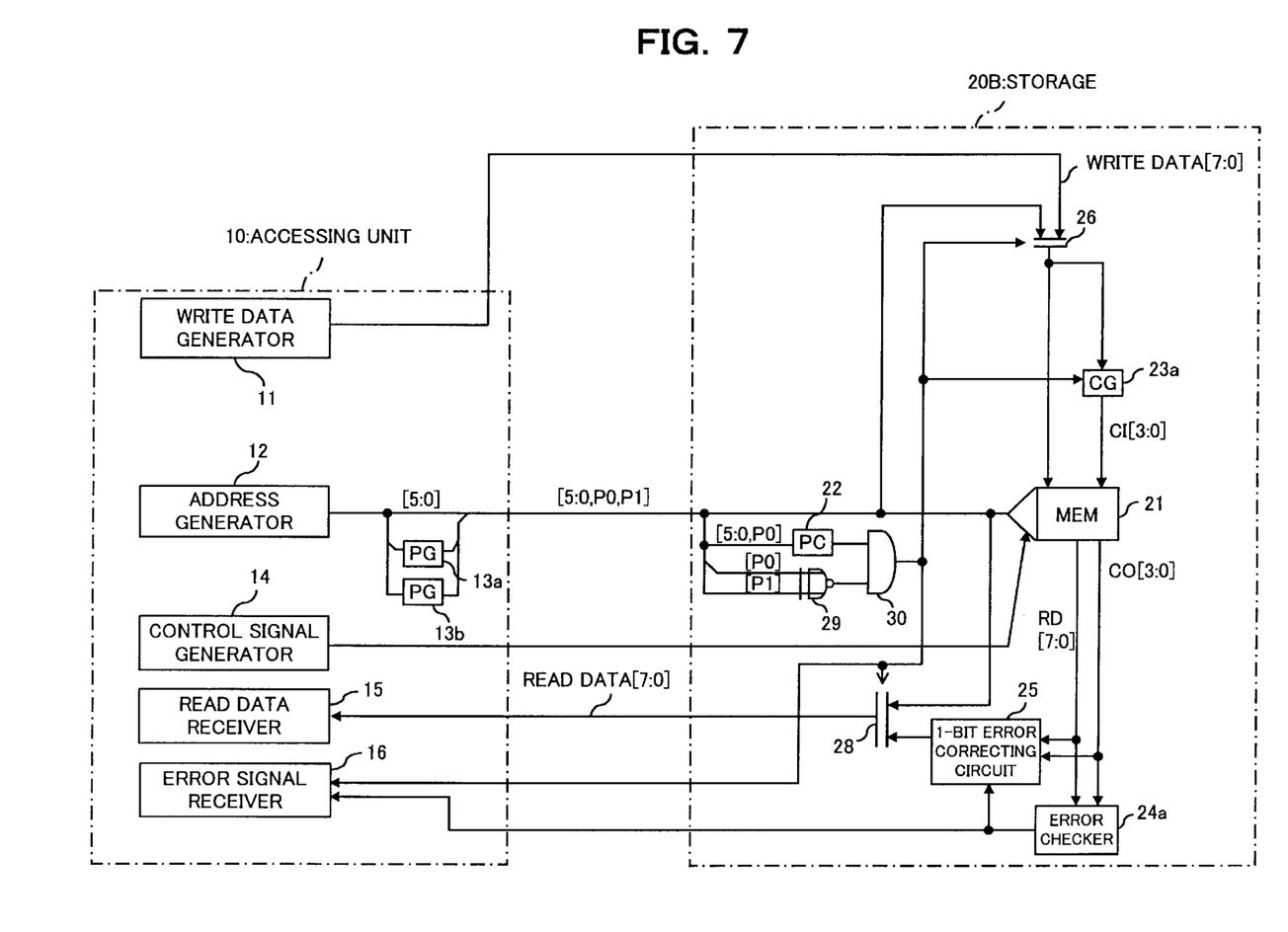
FIG. 7 is a block diagram showing a modified form of the information processor of the second embodiment.

FIG. 7 shows a modified example of the information processor (apparatus) of the second embodiment. This modification corresponds to that of the first embodiment shown in FIG. 3. In contrast to the accessing unit 10 of the information processor of FIG. 4, which is equipped with the only one parity generator 13, the accessing unit 10 of FIG. 7 has a pair of parity generators 13a and 13b. Further, in the storage 20B of FIG. 7, an XNOR gate 29 and an AND gate 30 are newly added. Like reference numbers designate similar parts or elements throughout several views of different embodiments, so their description is omitted here.

In the accessing unit 10 of FIG. 7, the address generator 12 generates 6-bit address data [5:0], to which two parity bits P0, P1 are attached to obtain 8-bit data [5:0,P0,P1], which is then sent from the accessing unit 10 to the storage 20B as an address. In the storage 20B of FIG. 7, 7 bits out of the 8-bit address from the accessing unit 10, excluding the parity bit P1, are input to the parity checker 22.

The information processor (storage 20B) of FIG. 7 provides the same results as those obtained in the above-described second embodiment. Further, only when an error has occurred in the address data, the address, in which the address parity error has occurred, is written to the memory 21. Accordingly, with no error contained in the address data, a write process is performed as normal to save unnecessary recovery processing, thus further improving the processing efficiency and throughput.

Likewise, only when an error has occurred in the address data, the address, in which the address parity error has occurred, is output as the read data to the accessing unit 10. Accordingly, with no error contained in the address data, a read process is performed as normal to save unnecessary recovery processing, thus further improving the processing efficiency and throughput.

Further, the present invention should by no means be limited to the above-illustrated embodiments, and various changes or modifications may be suggested without departing from the gist of the invention.

What is claimed is:

1. A method for processing an address parity error, comprising the steps of:
   (a) making a parity check over a parity-bitted address generated in write-accessing to a memory; and
   if such address parity error has been detected in the parity-bitted address as the result of the parity check,
   (b) switching circuitry in such a manner that, instead of write-data to be written in the write-accessing to the memory, the parity-bitted address, in which the address parity error has occurred, is written to said memory; and
   (c) writing the parity-bitted address to the memory.

2. A method according to claim 1, wherein if the parity-bitted address, in which said address parity error has occurred, is read out from said memory in read-accessing to said memory, a recovery process is made for the address parity error based on the parity-bitted address read out from said memory.

3. An apparatus comprising:
   a memory for storing various kinds of data;
   an address generator for generating an address of an access destination in accessing said memory;
   a parity generator for generating at least one parity bit for the address generated by said address generator and attaching the generated parity bit to the address to obtain a parity-bitted address;
   a parity checker for making a parity check over the parity-bitted address, which is obtained by said address generator and said parity generator, in accessing to said memory; and
   a first selector for selecting one of write data and the parity-bitted address for writing to said memory;
   said first selector being operative, if an address parity error has been detected as the result of the parity check made by said parity checker in write-accessing to said memory, to select the parity-bitted address, in which the address parity error has occurred, for writing the selected address instead of writing the write data to said memory during the write-accessing thereto.

4. An apparatus according to claim 3, further comprising:
   a check bit generator for generating an error-correcting check bit corresponding to data from said first selector and for writing to said memory both the generated error-correcting check bit and the last-named data; and
   an error checker for producing and outputting a syndrome code based on both read data from said memory and the error-correcting check bit for the read data in read-accessing to said memory;
   said error checker being operative, if the parity-bitted address, in which the address party error has occurred, is read out from said memory as the read data, to detect the occurrence of the address parity error based on the error-correcting check bit.

5. An apparatus according to claim 4, further comprising changing means for changing, during the writing of the parity-bitted address, in which the address parity error has occurred, the error-correcting check bit output from said check bit generator, in such a manner that a syndrome code indicating an uncorrectable error occurred is produced by said error checker upon read-out of the address from said memory as the read data.

6. An apparatus according to claim 5, wherein said changing means is in the form of a circuit for inverting bit data of the error-correcting check bit to be written to said memory from said check bit generator.

7. An apparatus according to claim 4, wherein said check bit generator generates, during the writing of the parity-bitted address, in which the address parity error has occurred, the error-correcting check bit in such a manner that a syndrome code to specify the address parity error is produced by said error checker upon read-out of the address from said memory as the read data.

8. An apparatus according to claim 3, further comprising a second selector for selecting and outputting one of read data from said memory and the parity-bitted address;
   said second selector being operative, if an address parity error has been detected as the result of the parity check made by said parity checker in read-accessing to said memory, to select the parity-bitted address, in which the address parity error has occurred, for outputting the selected address instead of outputting the read data during the read-accessing thereto.

9. An apparatus comprising:
   a memory for storing various kinds of data;
   an address generator for generating an address of an access destination in accessing said memory;
   a parity generator for generating at least one parity bit for the address generated by said address generator and attaching the generated parity bit to the address to obtain a parity-bitted address;
   a parity checker for making a parity check over the parity-bitted address, which is obtained by said address generator and said parity generator, in accessing to said memory;
   a first selector for selecting one of write data and the parity-bitted address for writing to said memory;
   said first selector being operative, if an address parity error has been detected as the result of the parity check made by said parity checker in write-accessing to said memory, to select the parity-bitted address, in which the address parity error has occurred, for writing the selected address instead of writing the write data to said memory during the write-accessing
   a second selector for selecting and outputting one of read data from said memory and the parity-bitted address;
   said second selector being operative, if an address parity error has been detected as the result of the parity check made by said parity checker in read-accessing to said memory, to select the parity-bitted address, in which the address parity error has occurred, for outputting the selected address instead of outputting the read data during the read-accessing thereto; and
   a judging section for judging, upon detection of an address parity error by said parity checker in accessing to said memory, whether or not the address parity error is due to the at least one parity bit generated by said parity generator;
   said second selector being operative, if an address parity error has been detected as the result of the parity check made by said parity checker in read-accessing to said memory and if it is judged by said judging section that the address parity error has never been caused by the parity bit, to select the parity-bitted address, in which the address parity error has occurred, for outputting the selected address during the read-accessing thereto; and
   said second selector being operative, if an address parity error has been detected as the result of the parity check made by said parity checker in read-accessing to said memory and if it is judged by said judging section that the address parity error has been caused by the parity bit, to select the read data for outputting during the read-accessing thereto.

10. An apparatus according to claim 9, wherein:

said parity generator generates plural parity bits for the address generated by said address generator and attaches the generated plural parity bits to the address; and said judging section discriminates whether or not the address parity error is due to the parity bits, based on whether or not the plural parity bits are identical.

11. An apparatus comprising:

a memory for storing various kinds of data;

an address generator for generating an address of an access destination in accessing said memory;

a parity generator for generating at least one parity bit for the address generated by said address generator and attaching the generated parity bit to the address to obtain a parity-bitted address;

a parity checker for making a parity check over the parity-bitted address, which is obtained by said address generator and said parity generator, in accessing to said memory; and a first selector for selecting one of write data and the parity-bitted address for writing to said memory;

said first selector being operative, if an address parity error has been detected as the result of the parity check made by said parity checker in write-accessing to said memory, to select the parity-bitted address, in which the address parity error has occurred, for writing the selected address instead of writing the write data to said memory during the write-accessing thereto; and a judging section for judging, upon detection of an address parity error by said parity checker in accessing said memory, whether or not the address parity error is due to at least one parity bit generated by said parity generator;

said first selector being operative, if an address parity error has been detected as the result of the parity check made by said parity checker in write-accessing to said memory and if it is judged by said judging section that the address parity error has never been caused by the parity bit, to select the parity-bitted address, in which the address parity error has occurred, for writing the selected address to said memory during the write-accessing thereto; and said first selector being operative, if an address parity error has been detected as the result of the parity check made by said parity checker in write-accessing to said memory and if it is judged by said judging section that the address parity error has been caused by the parity bit, to select the write data for writing to said memory during the write-accessing thereto.

12. An apparatus according to claim 11, wherein:

said parity generator generates plural parity bits for the address generated by said address generator and attaches the generated plural parity bits to the address; and said judging section discriminates whether or not the address parity error is due to the parity bits, based on whether or not the plural parity bits are identical.

13. A storage comprising:

a memory for storing various kinds of data;

a parity checker for making a parity check over a parity-bitted address; and a first selector for selecting one of write data and the parity-bitted address for writing to said memory;

said selector being operative, if an address parity error has been detected as the result of the parity check made by said parity checker in write-accessing to said memory, to select the parity-bitted address, in which the address parity error has occurred, for writing the selected address instead of writing the write data to said memory during the write-accessing thereto.

14. A storage according to claim 13, further comprising:

a check bit generator for generating an error-correcting check bit corresponding to data from said first selector and for writing to said memory both the generated error-correcting check bit and the last-named data; and an error checker for producing and outputting a syndrome code based on both read data from said memory and the error-correcting check bit for the read data in read-accessing to said memory;

said error checker being operative, if the parity-bitted address, in which the address party error has occurred, is read out from said memory as the read data, to detect the occurrence of the address parity error based on the error-correcting check bit.

15. A storage according to claim 14, further comprising changing means for changing, during the writing of the parity-bitted address, in which the address parity error has occurred, the error-correcting check bit output from said check bit generator, in such a manner that a syndrome code indicating an uncorrectable error occurred is produced by said error checker upon read-out of the address from said memory as the read data.

16. A storage according to claim 15, wherein said changing means is in the form of a circuit for inverting bit data of the error-correcting check bit to be written to said memory from said check bit generator.

17. A storage according to claim 14, wherein said check bit generator generates, during the writing of the parity-bitted address, in which the address parity error has occurred, the error-correcting check bit in such a manner that a syndrome code to specify the address parity error is produced by said error checker upon read-out of the address from said memory as the read data.

18. A storage comprising:

a memory for storing various kinds of data;

a parity checker for making a parity check over a parity-bitted address; and a first selector for selecting one of write data and the parity-bitted address for writing to said memory;

said selector being operative, if an address parity error has been detected as the result of the parity check made by said parity checker in write-accessing to said memory, to select the parity-bitted address, in which the address parity error has occurred, for writing the selected address instead of writing the write data to said memory during the write-accessing thereto; and a judging section for judging, upon detection of an address parity error by said parity checker in accessing to said memory, whether or not the address parity error is due to the at least one parity bit generated by said parity generator;

said first selector being operative, if an address parity error has been detected as the result of the parity check made by said parity checker in write-accessing to said memory and if it is judged by said judging section that the address parity error has never been caused by the parity bit, to select the parity-bitted address, in which the address parity error has occurred, for writing the selected address to said memory during the write-accessing thereto; and said first selector being operative, if an address parity error has been detected as the result of the parity check made by said parity checker in write-accessing to said memory and if it is judged by said judging section that the address parity error has been caused by the parity bit, to select the write data for writing to said memory during the write-accessing thereto.

19. A storage according to claim 13, further comprising a second selector for selecting and outputting one of read data from said memory and the parity-bitted address;

said second selector being operative, if an address parity error has been detected as the result of the parity check made by said parity checker in read-accessing to said memory, to select the parity-bitted address, in which the address parity error has occurred, for outputting the selected address instead of outputting the read data during the read-accessing thereto.

20. A storage comprising:

a memory for storing various kinds of data;

a parity checker for making a parity check over a parity-bitted address; and a first selector for selecting one of write data and the parity-bitted address for writing to said memory;

said first selector being operative, if an address parity error has been detected as the result of the parity check made by said parity checker in write-accessing to said memory, to select the parity-bitted address, in which the address parity error has occurred, for writing the selected address instead of writing the write data to said memory during the write-accessing thereto;

a second selector for selecting and outputting one of read data from said memory and the parity-bitted address;

said second selector being operative, if an address parity error has been detected as the result of the parity check made by said parity checker in read-accessing to said memory, to select the parity-bitted address, in which the address parity error has occurred, for outputting the selected address instead of outputting the read data during the read-accessing thereto; and a judging section for judging, upon detection of an address parity error by said parity checker in accessing said memory, whether or not the address parity error is due to the at least one parity bit generated by said parity generator;

said second selector being operative, if an address parity error has been detected as the result of the parity check made by said parity checker in read-accessing to said memory and if it is judged by said judging section that the address parity error has never been caused by the parity bit, to select the parity-bitted address, in which the address parity error has occurred, for outputting the selected address during the read-accessing thereto; and said second selector being operative, if an address parity error has been detected as the result of the parity check made by said parity checker in read-accessing to said memory and if it is judged by said judging section that the address parity error has been caused by the parity bit, to select the read data for outputting during the read-accessing thereto.

* * * * *